United States Patent
Zhen et al.

(10) Patent No.: US 8,681,875 B2
(45) Date of Patent: Mar. 25, 2014

(54) APPARATUS AND METHOD FOR CODING BLOCK BOUNDARY DETECTION USING INTERPOLATED AUTOCORRELATION

(75) Inventors: Rixin Zhen, Singapore (SG); Yong Huang, Singapore (SG); Patricia Chiang, Singapore (SG)

(73) Assignee: STMicroelectronics Asia Pacific Pte., Ltd., Singapore (SG)

( * ) Notice: Subject to any disclaimer, the term of this patent is extended or adjusted under 35 U.S.C. 154(b) by 1146 days.

(21) Appl. No.: 12/313,830

(22) Filed: Nov. 25, 2008

(65) Prior Publication Data
US 2010/0128168 A1    May 27, 2010

(51) Int. Cl.
*H04N 7/12* (2006.01)

(52) U.S. Cl.
USPC .................................................. 375/240.24

(58) Field of Classification Search
USPC ............... 375/240.01–240.29; 382/300–309
IPC ........................................................ H04N 7/12
See application file for complete search history.

(56) References Cited

U.S. PATENT DOCUMENTS

| | | | |
|---|---|---|---|
| 5,347,308 A * | 9/1994 | Wai | 375/240.23 |
| 2004/0013315 A1* | 1/2004 | Li et al. | 382/268 |
| 2005/0078750 A1* | 4/2005 | Shen et al. | 375/240.12 |
| 2005/0169557 A1* | 8/2005 | Xavier | 382/300 |
| 2008/0015440 A1* | 1/2008 | Shandas et al. | 600/458 |
| 2008/0199078 A1* | 8/2008 | Lam et al. | 382/190 |
| 2009/0051714 A1* | 2/2009 | Ohhara | 345/690 |
| 2009/0208140 A1* | 8/2009 | Jayant et al. | 382/309 |

\* cited by examiner

*Primary Examiner* — Dave Czekaj
*Assistant Examiner* — Tracy Li
(74) *Attorney, Agent, or Firm* — Munck Wilson Mandala, LLP

(57) ABSTRACT

An apparatus and method for coding block boundary detection using interpolated autocorrelation is disclosed. Input video frames are processed to obtain a binary map of possible block boundary pixels including original and rescaled block boundaries. The boundary pixel map is converted to a boundary histogram. Then interpolated autocorrelation is applied to the boundary histogram to detect the block size and block size offset. The interpolated autocorrelation handles both integer sizes and non-integer sizes. A confidence measure is also determined that reflects the accuracy of the detection result. The output for the current video frame is also post processed with information from previous frames to provide better temporal stability.

20 Claims, 6 Drawing Sheets

APPARATUS AND METHOD FOR CODING BLOCK BOUNDARY DETECTION USING INTERPOLATED AUTOCORRELATION

TECHNICAL FIELD

This disclosure relates generally to the field of video image processing and more specifically to methods of coding block boundary detection.

BACKGROUND

Very few techniques have been proposed to date to address the problem of detecting the size and position of coding blocks in possibly rescaled video images. One prior art method has been disclosed in International Patent WO 2006/010276 A1 entitled Apparatus and Method for Adaptive 3D Artifact Reducing for Encoded Image Signal issued to Chon Tam Le Dihn et al. ("Le Dihn"). The Le Dihn patent discloses a method for block offset detection on coded video images. The Le Dihn algorithm detects the block offset position for the eight by eight (8×8) DCT (Discrete Cosine Transform) block boundaries with (1) a boundary pixel detection method for the identification of possible block boundary pixels and (2) a histogram analysis for the calculation of offset position.

The Le Dihn patent addresses the problem of block offset detection on non-rescaled sequences. The mask and test are designed for non-rescaled boundaries and are thus less effective on rescaled boundaries. In addition, the Le Dihn method applies only to luminance data and does not consider factors such as frame/field macroblock coding type and interlace handling, which can cause the detected result to be inaccurate under certain circumstances. Furthermore, the Le Dihn method does not address the fundamental problem of block size detection.

U.S. Pat. No. 6,636,645 entitled Image Processing Method for Reducing Noise and Blocking Artifact in a Digital Image issued to Qing Yu et al. ("Yu") introduces a similar algorithm for JPEG (Joint Photographic Experts Group) block offset detection. Instead of a second order derivative, the Yu algorithm uses a first order derivative, the gradient along the horizontal direction and vertical direction, to detect the boundary offsets. The gradient values of the columns that are separated by one block size are summed and the position of the maximum value is assumed to derive the horizontal offset. The Yu algorithm uses a dynamic threshold obtained from the average gradient value of the image to filter out the edges from the block boundaries.

The Yu algorithm also uses the detection result as an indicator to image blockiness. If the offsets from different channels of the same JPEG image do not agree with each other, the Yu algorithm will conclude that the blockiness is not obvious and thus no filtering is needed. The Yu algorithm assumes fixed block size and only addresses offset detection for non-rescaled images.

Block size detection is essentially a problem of repeated pattern detection. This means that reference to other very different applications may be useful. An example of such an application is described in a paper entitled "A Parallel-Line Detection Algorithm Based on HMM Decoding" by Yefeng Zheng, Huiping Li and David Doermann published in IEEE Transactions on Pattern Analysis and Machine Intelligence, Volume 27, Number 5, May 2005. Zheng, Li and Doermann proposed a complete algorithm to extract form lines from scanned form images, including a text filter, a Hidden Markov Model based line detection block, and a gap estimation block.

While the line extraction and the text filter part are not relevant to the context of block boundary detection, the line gap estimation block assumes that the distance between the form lines are fixed and uses an autocorrelation based method to estimate the distance, which is similar to the application of block size detection. However, with standard integer autocorrelation, the problem of non-integer block size is not addressed. There is also no means to determine the detection accuracy.

Another similar application is found in the audio domain in a paper entitled "An Autocorrelation Pitch Detector and Voicing Decision with Confidence Measures Developed for Noise-Corrupted Speech" published by David A. Krubsack and Russell J. Niederjohn in IEEE Transactions of Signal Processing, Volume 39, Number 2, pp. 319-329, February 1991. In the Krubsack-Niederjohn ("KN") algorithm the speech signal is divided into segments of fifty one and two tenths milliseconds (51.2 msec) and the autocorrelation function is used to pick the pitch. The KN algorithm starts with choosing the maximum peak in the human pitch range of fifty Hertz (50 Hz) to three hundred thirty three Hertz (333 Hz). The KN algorithm further checks pitch values at the submultiples of the dominant peak to reduce wrong period errors.

In addition, the KN algorithm provides a confidence measure for the detected result based on parameters extracted from the autocorrelation process. The KN algorithm does not address the problem of non-integer block sizes. Moreover, due to the different nature of an audio signal with respect to a video signal, the parameters that are extracted and used to determine pitch detection confidence are not suitable for defining the confidence measure in block boundary detection.

The quantization in a video compression process produces video artifacts on the decoded video images. Typical coding noises include blocking noise and ringing noise. Blocking noise is caused by different quantization levels across DCT (Discrete Cosine Transform) blocks and is characterized by 8×8 block patterns formed by sharp horizontal and vertical edges. There are several causes of ringing noise, which manifest as sinusoids near strong edges. Similar to blocking noise, ringing noise is also related to quantization levels, which differs from one DCT block to another. This explains why many noise reduction algorithms perform local analysis and filtering on an 8×8 block basis.

While prior art noise reduction algorithms work effectively on non-rescaled images, they will not work for rescaled sequences. For example, a deblocking algorithm that is designed to work on 8×8 blocks will pick the wrong boundary positions to apply the filtering process, not only causing the deblocking to be ineffective, but also introducing potential artifacts. Considering that many SD (Standard Definition) video inputs are rescaled to HD (High Definition) before playback on today's HDTV (High Definition Television) sets, a block boundary detector which reports the size and position of the coding blocks becomes necessary for effective noise reduction.

Knowledge of the boundary position is not only critical for deblocking algorithms, whose very purpose is to remove the boundaries, but is also useful for generic algorithms designed to detect or remove noises caused by block-based encoding. Knowledge of the boundary position is also helpful in determining the image quality and the resealing factor.

There is presently no existing solution that addresses the specific problem of coding block boundary detection. Although some solutions exist for the detection of boundary offset in non-rescaled cases, these solutions will not work on rescaled sequences.

The challenges of block boundary detection for arbitrary input lie not only in the size detection methodology, but also in block boundary pixel identification. While original block boundaries are sharp one-pixel edges that can be easily picked out with generic edge detection techniques, rescaled boundaries are much more challenging to detect. First, this is due to the blurring of the boundaries caused by the interpolation process. Depending on the rescaling method and the rescaling factor, the one-pixel block boundaries may spread to two to four pixels. Second, the rescaling process may also be coupled with other processing such as detinterlacing, interlacing, and 4:2:0 to 4:2:2 conversion, all of which further blur the boundaries. As a result, the originally sharp boundaries in a PAL (Phase Alternate Line) sequence may be difficult to identify and detect after the sequence is rescaled to 1080i.

Another major challenge is non-integer block size detection. Since the standard autocorrelation process only detects integer size, previously there has been no means to detect any decimal block size. One possible method for converting non-integer block size detection to integer block size detection is to 1:100 interpolate the sequence (for a precision of 0.01) and then apply an integer autocorrelation process. This method, however, is neither efficient nor effective.

Another challenge with block size detection is temporal stability. For certain noise reduction algorithms, block size will have a great impact on the filtering strength. An abrupt change in filtering strength might cause notable inconsistency in the output video due to different filtering applied to neighborhood frames. Therefore the block boundary detector must ensure the stability of the output under all scenarios, even if the input is a clean sequence.

To remedy the deficiencies of the above identified prior art methods there is a need in the art for an improved method for detecting block boundaries in video image processing.

SUMMARY

The method of the present invention provides a block boundary detection algorithm that processes input video frames to obtain a binary map of possible block boundary pixels. The algorithm is designed to take into account the different characteristics of original and rescaled block boundaries. After the boundary pixel map has been generated, the boundary pixel map is converted to a boundary histogram. Then an autocorrelation based approach is used to detect the block size. The algorithm uses a novel customized interpolated autocorrelation to handle the non-integer size problem. The method of the invention gives a confidence measure output that reflects the accuracy of the detection result. Lastly, the output for the current frame is post processed with information from previous frames for better temporal stability. The details of the method will be described more fully later in this patent document.

For block boundary pixel identification the method of the present invention applies different techniques to handle original and rescaled block boundaries. This approach notably improves the detection accuracy for rescaled sequences. The method of the present invention further improves performance on resized sequences through applying the same autocorrelation process to multiple inputs, including boundary histograms generated from input frames and from different pixel identification methods for original and rescaled boundaries. Each application of the autocorrelation process produces a size plus offset pair together with a confidence value. The result with the highest confidence value is selected as the final output result. By relying on a fair and unified confidence measurement, the selection process maximizes the probability of obtaining the correct result, even under very challenging rescaled scenarios such as almost invisible block boundaries.

As for the non-integer size detection, the method of the present invention considers both effectiveness and efficiency. A customized autocorrelation method for non-integers is employed. The customized autocorrelation method is the same for the integer autocorrelation. The customized autocorrelation method provides a size plus offset pair and a confidence value measurement. This enables a fair choice to me made between integer values and non-integer values. The customized autocorrelation method requires interpolation to obtain histogram values at non-integer positions. A spline interpolation method is used that produces better results than simple linear interpolation. For efficiency, the method of the present invention supports non-integer size on a profile basis. The method of the present invention supports three typical non-integer sizes corresponding to three rescaling scenarios, thereby minimizing computational complexity. On the other hand, additional profiles can easily be added as needed in practice.

To ensure temporary stability, the method of the present invention employs a temporal control unit that filters the detection result based on previous results. The temporal control unit prevents abrupt changes in the output with a confidence adjustment method that strongly favors the previous results. The temporal control unit, however, does not prevent the new result from replacing the previous result when the input size or offset is actually changed.

The method of the present invention may be employed prior to any standalone digital noise reduction algorithms or integrated noise reduction systems. As the first block in a processing chain, the method of the present invention provides critical size, offset and detection confidence information to the rest of the components in such a system.

The block boundary detection system of the present invention comprises (1) a boundary pixel identifier that generates horizontal and vertical boundary maps, and (2) a histogram generator that converts the 2D boundary maps to 1D boundary histograms and post processes the histograms with averaging and filtering functions, and (3) an autocorrelation based size and offset detector that produces multiple "size plus offset plus confidence" combinations and selects the output block size and offset based on the confidence measurement, and (4) a temporal controller that stabilizes the output "size plus offset plus confidence" result.

The block boundary detection system of the present invention is applied to both the luminance data and the chrominance data of the encoded video signal. The boundary pixel identifier and the histogram generator produces boundary pixel histograms for both luminance frames and chrominance frames. The autocorrelation based size and offset detector operates on the chrominance frames to obtain block size and operates on the luminance frames to obtain the block offset and the final confidence output.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 10, discussed below, and the various embodiments described in this disclosure are by way of illustration only and should not be construed in any way to limit the scope of the claimed invention. Those skilled in the art will understand that the principles described in this disclosure may be implemented in any suitably arranged device or system.

Figure 1:
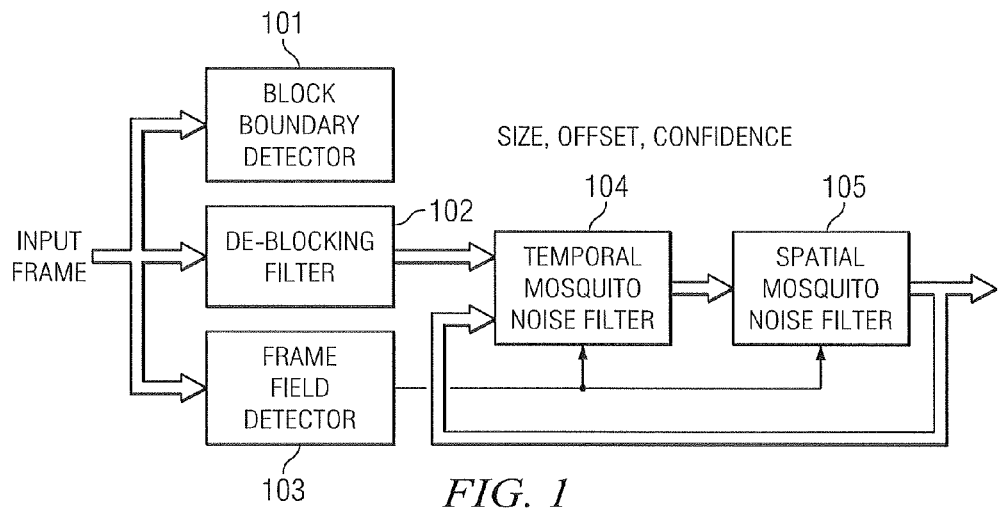
FIG. 1 illustrates a schematic diagram of an advantageous embodiment of an exemplary coding noise reduction system that comprises a block boundary detector of the present invention.

FIG. 1 illustrates a schematic diagram of an advantageous embodiment of an exemplary coding noise reduction system that comprises a block boundary detector of the present invention. The source of the input frames may be raw analog or digital input from DVD (Digital Video Disk) playback, set top boxes, or computers. The block boundary detector 101 processes the input frames and provides size, offset and confidence information to all the other units in the system.

The deblocking filter 102 removes the blocking artifacts along block boundaries. The frame/field detector 103 detects whether each macroblock is frame coded or field coded and sends the information to the other blocks in the system. The temporal mosquito noise filter 104 and the spatial mosquito noise filter 105 remove temporal and spatial mosquito noise (also classified as ringing noise). The block boundary detector 101 can work in the integrated system or can work with any standalone noise reduction algorithm.

Figure 2:
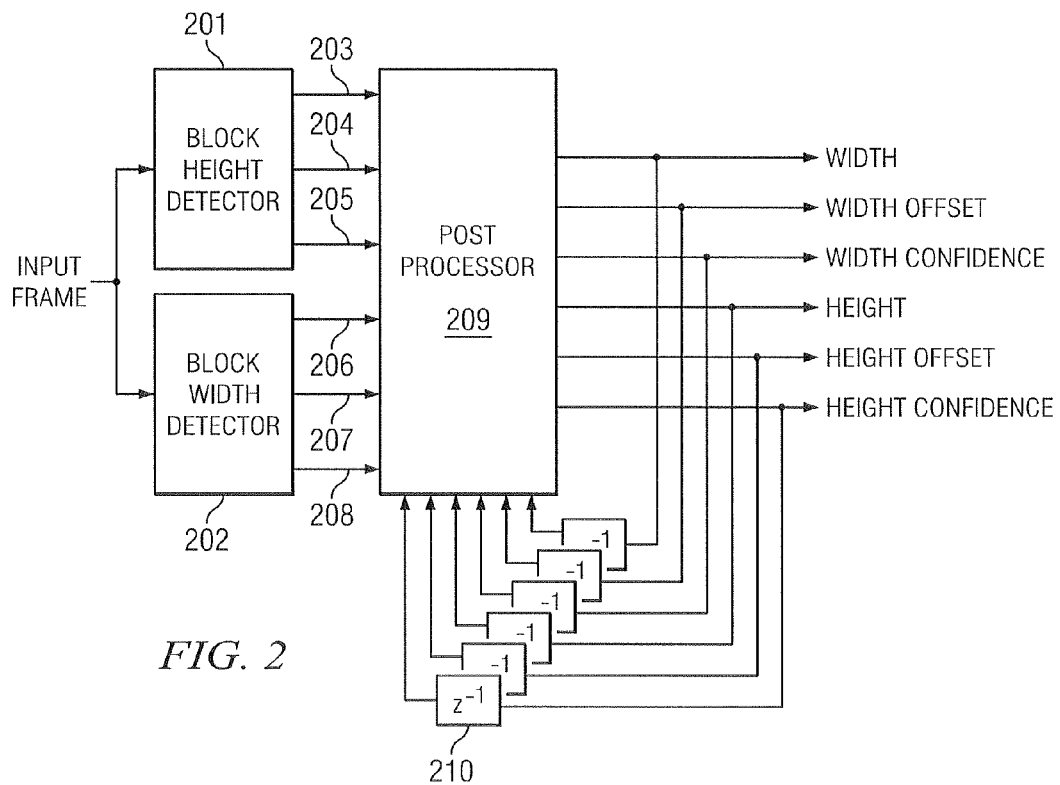
FIG. 2 illustrates a schematic diagram of an advantageous embodiment of a block boundary detector of the present invention.

FIG. 2 illustrates a schematic diagram of an advantageous embodiment of the block boundary detector 101 of the present invention. The block boundary detector 101 comprises a block height detector 201, a block width detector 202, a post processor unit 209, and six (6) feedback delay units 210, connected together as shown in FIG. 2.

An input frame is provided to the block height detector 201 and to the block width detector 202. The block height detector 201 processes the input frame and outputs a value of block height 203, a value of block height offset 204 and a value of block height confidence 205 to the post processor 209. The block width detector 202 processes the input frame and outputs a value of block width 206, a value of block width offset 207 and a value of block width confidence 208 to the post processor 209.

The post processor 209 receives the output from the block height detector 201 and receives the output from the block width detector 202. The post processor 209 applies further processing and outputs values of (1) width, and (2) width offset, and (3) width confidence, and (4) height, and (5) height offset, and (6) height confidence. The post processor 209 also receives a delayed version of the output results from the feedback delay units 210. The post processor 209 uses the delayed version of the output results for recursive control of the system output.

Figure 3:
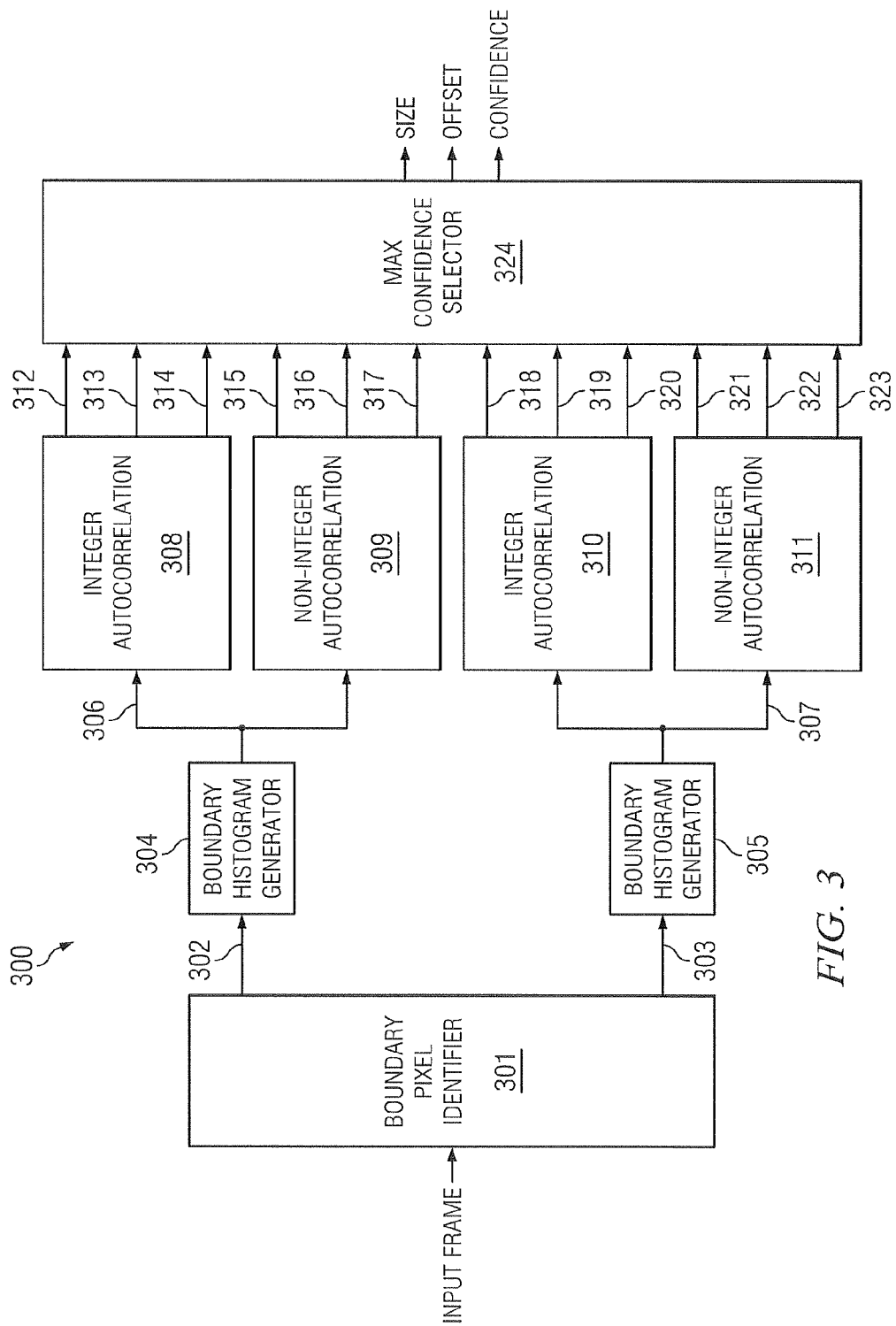
FIG. 3 illustrates a schematic diagram of an advantageous embodiment of an exemplary block dimension boundary detector of the present invention.

FIG. 3 illustrates a schematic diagram of an advantageous embodiment of an exemplary block dimension detector 300 of the present invention. The block dimension detector 300 may be used to implement the block height detector 201 that is shown in FIG. 2. The block dimension detector 300 may also be used to implement the block width detector 202 that is shown in FIG. 2.

The block dimension detector 300 comprises a boundary pixel identifier 301, a first boundary histogram generator 304, a second boundary histogram generator 305, a first integer autocorrelation unit 308, a second integer autocorrelation unit 310, a first non-integer autocorrelation unit 309, a second non-integer autocorrelation unit 311, and a max confidence selector 324, connected together as shown in FIG. 3.

The boundary pixel identifier 301 identifies possible block boundaries in an input image. The output of the boundary pixel identifier 301 comprises the original boundary map 302 (a binary map of pixels that are classified under original boundaries) and the rescaled boundary map 303 (a binary map of pixels that are classified under rescaled boundaries).

The first boundary histogram generator 304 and the second boundary histogram generator 305 are functionally identical blocks that convert the original boundary map 302 and the rescaled boundary map 303 into boundary histograms. The first boundary histogram generator 304 converts the original boundary map 302 into an original boundary histogram 306. The second boundary histogram generator 305 converts the rescaled boundary map 303 into a rescaled boundary histogram 307.

Both boundary histograms 306 and 307 go through two different autocorrelation processes. The first integer autocorrelation unit 308 and the second integer autocorrelation unit 310 are identical units that apply integer autocorrelation and generate integer size plus offset candidates together with a confidence measure. The first non-integer autocorrelation unit 309 and the second non-integer autocorrelation unit 311 are identical units that apply non-integer autocorrelation and generate non-integer size plus offset candidates together with a confidence measure.

The first boundary histogram generator 304 and the second boundary histogram generator 305 are functionally identical blocks that convert the input boundary maps (302 and 303) into boundary histograms (306 and 307). The first boundary histogram generator 304 provides the original boundary histogram 306 to the first integer autocorrelation unit 308 and to the first non-integer autocorrelation unit 309. The second boundary histogram generator 305 provides the rescaled boundary histogram 307 to the second integer autocorrelation unit 310 and to the second non-integer autocorrelation unit 311.

As shown in FIG. 3, there are twelve outputs from the four autocorrelation units (308, 309, 310, 311).

Reference numeral 312 designates an integer size candidate based on the original boundary histogram 306.

Reference numeral 313 designates an integer offset candidate based on the original boundary histogram 306.

Reference numeral 314 designates a confidence measure of the detection result of the first integer autocorrelation unit 308.

Reference numeral 315 designates a non-integer size candidate based on the original boundary histogram 306.

Reference numeral 316 designates a non-integer offset candidate based on the original boundary histogram 306.

Reference numeral 317 designates a confidence measure of the detection result of the first non-integer autocorrelation unit 309.

Reference numeral 318 designates an integer size candidate based on the rescaled boundary histogram 307.

Reference numeral 319 designates an integer offset candidate based on the rescaled boundary histogram 307.

Reference numeral 320 designates a confidence measure of the detection result of the second integer autocorrelation unit 310.

Reference numeral 321 designates a non-integer size candidate based on the rescaled boundary histogram 307.

Reference numeral 322 designates a non-integer offset candidate based on the rescaled boundary histogram 307.

Reference numeral 323 designates a confidence measure of the detection result of the second non-integer autocorrelation unit 311.

The outputs (312, 313, 314) of the first integer autocorrelation unit 308 are input to a max confidence selector unit 324. The outputs (315, 316, 317) of the first non-integer autocorrelation unit 309 are also input to the max confidence selector unit 324. The outputs (318, 319, 320) of the second integer autocorrelation unit 310 are also input to the max confidence selector unit 324. The outputs (321, 322, 323) of the second non-integer autocorrelation unit 311 are also input to the max confidence selector unit 324.

The max confidence selector unit 324 selects the final "size plus offset plus confidence" output from the four sets of autocorrelation inputs based solely on confidence values. The output set with the maximum confidence value is selected as the final "size plus offset plus confidence" output.

The block boundary detection system of the present invention that has been described with reference to FIG. 3 is employed in both the block height detector 201 and the block width detector 202 that are shown in FIG. 2.

Figure 4:
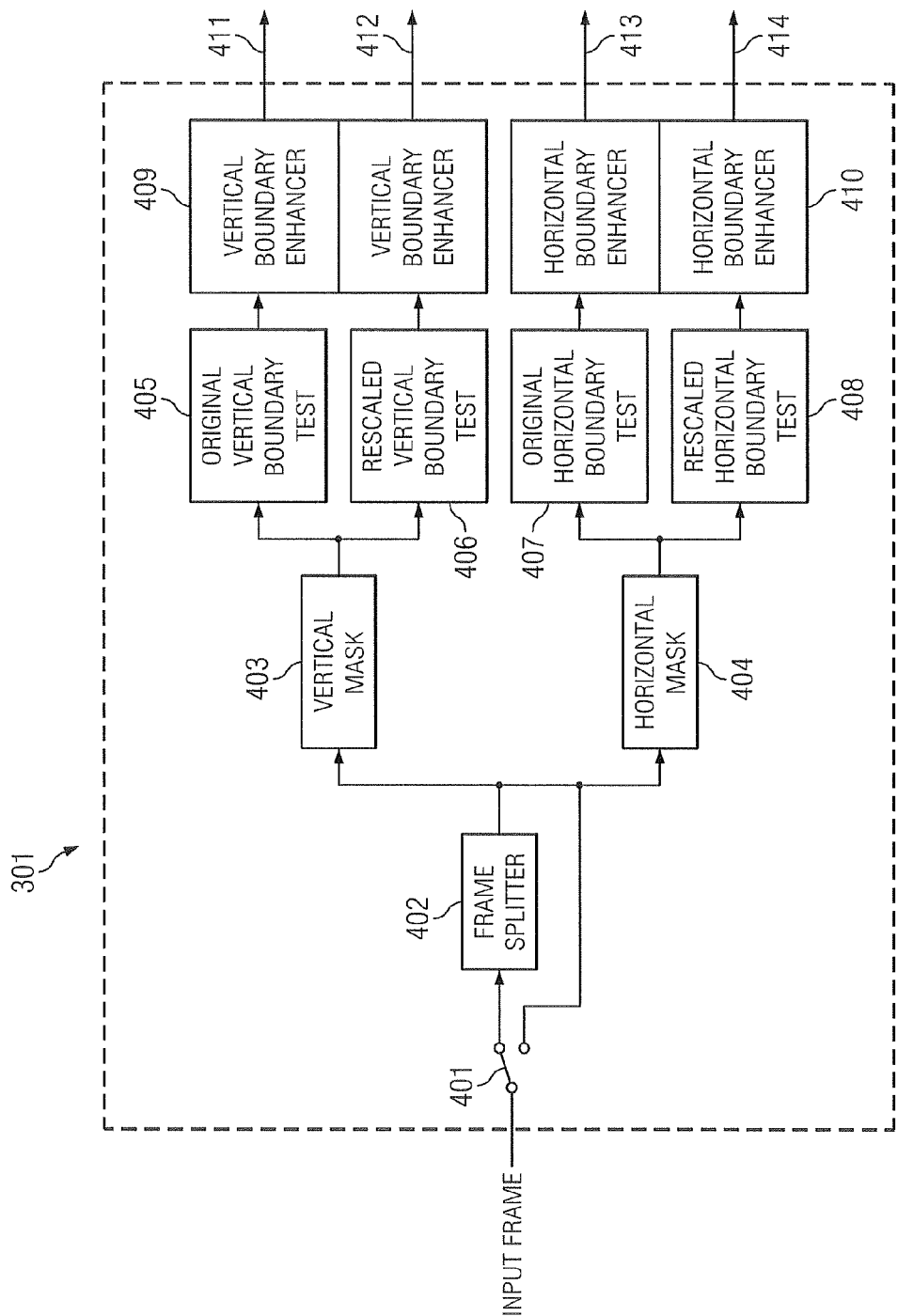
FIG. 4 illustrates a schematic diagram of an advantageous embodiment of a boundary pixel identifier unit of the present invention.

FIG. 4 illustrates an advantageous embodiment of a boundary pixel identification system of the present invention. Boundary pixel identifier 301 comprises the elements that are shown in FIG. 4. The boundary pixel identifier 301 comprises a switch 401, a frame splitter 402, a vertical mask unit 403, a horizontal mask unit 404, an original vertical boundary test unit 405, a rescaled vertical boundary test unit 406, an original horizontal boundary test unit 407, a rescaled horizontal boundary test unit 408, a vertical boundary enhancer unit 409, and a horizontal boundary enhancer unit 410, connected together as shown in FIG. 4.

The input frame is high-pass filtered and the filtered image is further tested to generate the output binary boundary maps. The switch 401 determines whether the input frame should be split into fields according to the interface/progressive flag obtained from the system. The frame splitter 402 splits the input frame into two fields to avoid mistaking interlaced lines as block boundaries. The vertical mask unit 403 and the horizontal mask unit 404 are generic second derivative operators for vertical and horizontal edge detection, respectively.

The original vertical boundary test unit 405 is designed to detect original vertical boundaries. The processing window for the original vertical boundary test unit 405 is shown below. Pixel zero ("0") is the pixel of interest.

```
2 3
0 1
4 5
```

The decision on whether Pixel "0" is a pixel on the vertical boundaries is based on a zero-crossing check in the second derivative filtered image. There is also a magnitude limit to filter out the edges from block boundaries. The equation is listed below.

$$P2*P3<0 \qquad 1:$$

$$P0*P1<0 \qquad 2:$$

$$P4*P5<0 \qquad 3:$$

$$LT<|P0|<UT \qquad 4:$$

$$LT<|P1|<UT \qquad 5:$$

In the above set of criteria, the term Pn indicates the pixel value at position "n" of the vertically masked image. LT and UT represent a predefined lower threshold (LT) and a predefined upper threshold (UT), respectively. Different weights are added to the detected boundary pixel according to the magnitude |P0| as shown below.

$$LT<|P0|<LT*2: \text{Weight}=1$$

$$LT*2<|P0|<LT*3: \text{Weight}=2$$

$$LT*3<|P0|<UT: \text{Weight}=3$$

The rescaled vertical boundary test unit 406 is designed to detect rescaled vertical boundaries. The processing window for the rescaled vertical boundary test unit 406 is shown below. Pixel "0" is the pixel of interest.

```
3 4 5
1 0 2
6 7 8
```

The equation for deciding whether Pixel "0" is a boundary pixel is listed below.

$$P3*P5<0 \qquad 1:$$

$$P0*P2<0 \qquad 2:$$

$$P6*P8<0 \qquad 3:$$

$$LT<|P0|<UT \qquad 4:$$

$$LT<|P1|<UT \qquad 5:$$

$$|P0|<|P1| \qquad 6:$$

$$|P0|<|P2| \qquad 7:$$

Similar to the original vertical boundary test unit 405, weights can be added to the binary pixel map as set forth below to emphasize pixels with a higher probability of being a boundary pixel.

LT<|P0|<LT*2: Weight=1

LT*2<|P0|<LT*3: Weight=2

LT*3<|P0|<UT: Weight=3

In the above set of criteria, the term Pn indicates the pixel value at position "n" of the vertically masked image. LT and UT represent a predefined lower threshold (LT) and a predefined upper threshold (UT), respectively. The pixels which do not satisfy the above criteria are passed on to the original vertical boundary test unit 405 for original boundary map generation, while the pixels that do satisfy the above criteria for rescaled boundaries will not be included in the original vertical boundary test unit 405. This design enables the rescaled vertical boundary test unit 406 to serve as a pre-processing filter for the original vertical boundary test unit 405. This feature helps to filter out textures and object edges for non-rescaled images.

The original horizontal boundary test unit 407 is designed to detect original horizontal boundaries. The processing window for the original horizontal boundary test unit 407 is shown below. Pixel "0" is the pixel of interest.

```
2 0 4
3 1 5
```

The decision on whether Pixel "0" is a pixel on the horizontal boundaries is based on a zero-crossing check in the second derivative filtered image. There is also a magnitude limit to filter out the object edges from block boundaries. The equation is listed below.

P2*P3<0                1:

P0*P1<0                2:

P4*P5<0                3:

LT<|P0|<UT             4:

LT<|P1|<UT             5:

In the above set of criteria, the term Pn indicates the pixel value at position "n" of the horizontally masked image. LT and UT represent a predefined lower threshold (LT) and a predefined upper threshold (UT), respectively. Different weights are added to the detected boundary pixels according to the magnitude |P0| as shown below.

LT<|P0|<LT*2: Weight=1

LT*2<|P0|<LT*3: Weight=2

LT*3<|P0|<UT: Weight=3

The rescaled horizontal boundary test unit 408 is designed to detect rescaled horizontal boundaries. The processing window for the rescaled horizontal boundary test unit 408 is shown below. Pixel "0" is the pixel of interest.

```
3 1 6
4 0 7
5 2 8
```

The equation for deciding whether Pixel "0" is a boundary pixel is listed below.

P3*P5<0                1:

P0*P2<0                2:

P6*P8<0                3:

LT<|P0|<UT             4:

LT<|P1|<UT             5:

|P0|<|P1|              6:

|P0|<|P2|              7:

In the above set of criteria, the term Pn indicates the pixel value at position "n" of the horizontally masked image. LT and UT represent a predefined lower threshold (LT) and a predefined upper threshold (UT), respectively. In the same manner as the rescaled vertical boundary test unit 406, the pixels which do not satisfy the above criteria are passed on to the original horizontal boundary test unit 407 for original horizontal map generation, while the pixels that do satisfy the above criteria for rescaled horizontal boundaries will not be included in the original horizontal boundary test unit 407. This design enables the rescaled horizontal boundary test unit 408 to serve as a pre-processing filter for the original horizontal boundary test unit 407. This feature helps to filter out textures and object edges for non-rescaled images.

Figure 5:
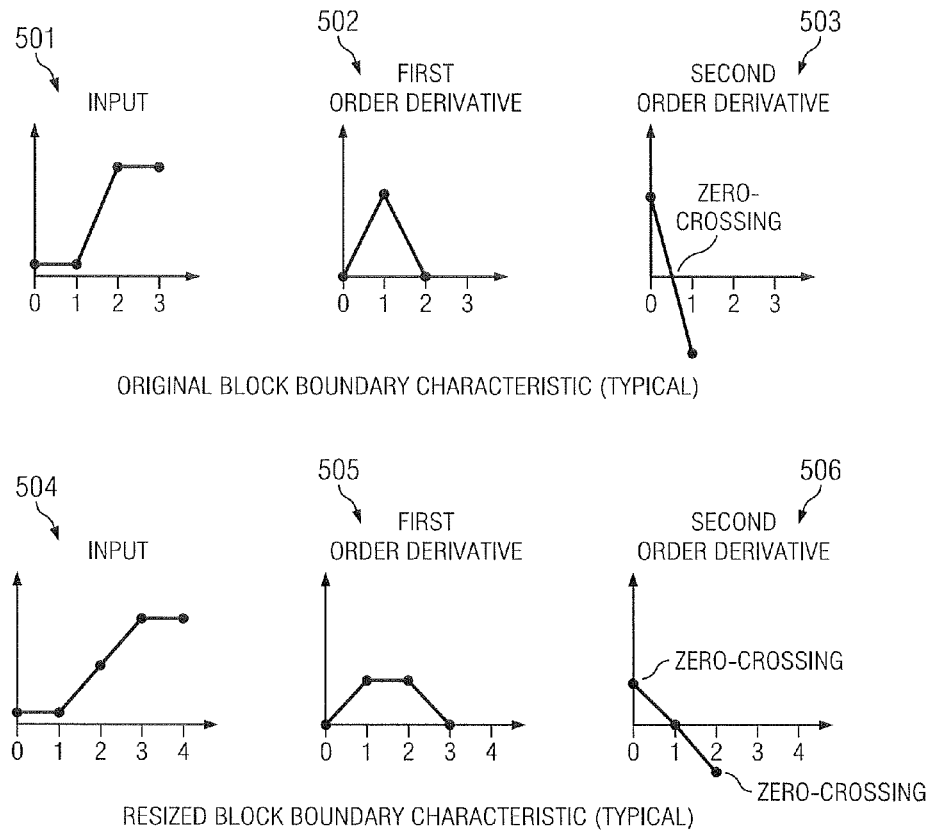
FIG. 5 illustrates schematic diagrams that provide a comparison of non-rescaled versus rescaled block boundary characteristics.

FIG. 5 illustrates a comparison of non-rescaled versus rescaled block boundary characteristics. FIG. 5 illustrates the design difference between original boundary detection and rescaled boundary detection. As shown in chart 501, original boundaries appear and sharp two-pixel transitions. As shown in chart 504, rescaled boundaries appear as blurred boundaries across three or four pixels (depending on the resealing method). The first order derivative for the original block boundary characteristic is shown in chart 502. The first order derivative for the rescaled block boundary characteristic is shown in chart 505. After taking the second order derivative at the vertical mask unit 403 and at the horizontal mask unit 404, the zero-crossing appears at different positions for the original image and the rescaled image. Chart 503 shows a typical position of a zero-crossing for an original block boundary detection. Chart 506 shows a typical position of a zero-crossing for a rescaled block boundary detection.

The original vertical boundary test unit 405 and the original horizontal boundary test unit 407 detect zero-crossings of the type shown in chart 503 (which correspond to sharp edges). The rescaled vertical boundary test unit 406 and the rescaled horizontal boundary test unit 408 detect zero-crossings of the type shown in chart 506 (which correspond to smooth edges across two to four pixels).

The vertical boundary pixel maps that are generated from the original vertical boundary test unit 405 and from the rescaled vertical boundary test unit 406 are further processed with the vertical boundary enhancer unit 409. The vertical boundary enhanced unit 409 is a three by three (3×3) mask unit that produces the final outputs of the vertical boundary pixel identifier. The output signal 411 from the vertical boundary enhancer unit 409 comprises an enhanced original vertical boundary map. The output signal 412 from the vertical boundary enhancer unit 409 comprises an enhanced rescaled vertical boundary map.

The vertical boundary enhancer unit 409 has the following configuration.

$$\begin{array}{ccc} -2 & 2 & -2 \\ 0 & 4 & 0 \\ -2 & 2 & -2 \end{array}$$

The vertical boundary enhancer unit 409 further adjusts the weight of the boundary pixel map according to the characteristics that block boundaries should be consistent across one line or column. Therefore, if a neighborhood pixel on the same boundary line is also detected as a boundary pixel, then the pixel is given a higher weight. If a neighborhood pixel on a diagonal direction is also detected as a boundary pixel, it is likely that the pixel comes form some random texture or object edges instead of from a block boundary. Therefore such pixels are given a lower weight.

The horizontal boundary pixel maps that are generated from the original horizontal boundary test unit 407 and from the rescaled horizontal boundary test unit 408 are further processed with the horizontal boundary enhancer unit 410. The horizontal boundary enhancer unit 410 is a three by three (3×3) mask unit that produces the final outputs of the horizontal boundary pixel identifier. The output signal 413 from the horizontal boundary enhancer unit 410 comprises an enhanced original horizontal boundary map. The output signal 414 from the horizontal boundary enhancer unit 410 comprises an enhanced rescaled horizontal boundary map.

The horizontal boundary enhancer unit 410 has the following configuration.

$$\begin{array}{ccc} -2 & 0 & -2 \\ 2 & 4 & 2 \\ -2 & 0 & -2 \end{array}$$

Figure 6:
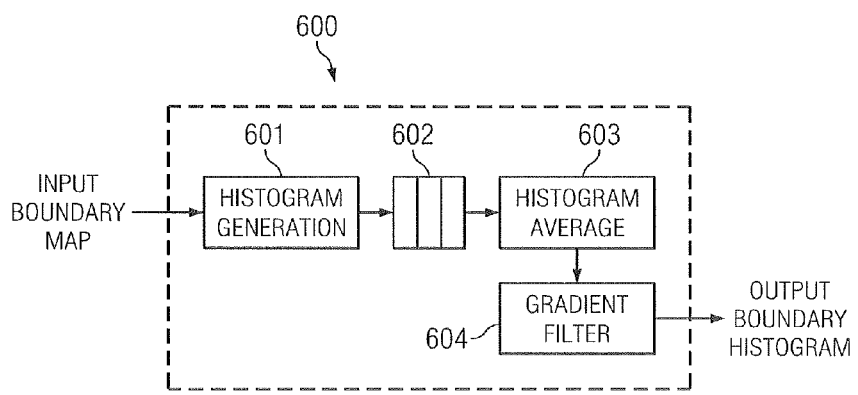
FIG. 6 illustrates a schematic diagram of an advantageous embodiment of a boundary histogram generation unit of the present invention.

FIG. 6 illustrates an advantageous embodiment of a histogram generation unit 600 of the present invention. The histogram generation unit 600 that is illustrated in FIG. 6 may be used to implement the boundary histogram generator 304 that is shown in FIG. 3 or the boundary histogram generator 305 that is shown in FIG. 3. The vertical and horizontal boundary maps that are generated by the boundary pixel identifier are independently processed.

Boundary histogram generator 600 comprises a histogram generation unit 601, a histogram window 602, a histogram average unit 604, and a gradient filter mask 604, connected together as shown in FIG. 6. For the vertical maps, the histogram generation unit 601 counts the number of weighted boundary pixels for each column and stores the count into arrays of width equal to the width of the input images. For the horizontal maps, the histogram generation unit 601 counts the number of weighted boundary pixels for each row and stores the count into arrays of height equal to the height of the input images.

The generated histogram is stored in the histogram window 602. Histogram window 602 stores histograms from the current frame and from "n−1" previous frames, where "n" is a configurable parameter preferably set between the values of three (3) and five (5). All the histograms in one histogram window 602 are averaged in histogram average unit 603 and processed by a gradient filter mask 604. Gradient filter mask has a mask coefficient of [−1,1]. The gradient filter mask outputs the output boundary histogram to the autocorrelation blocks for the size and offset detection process.

Figure 7:
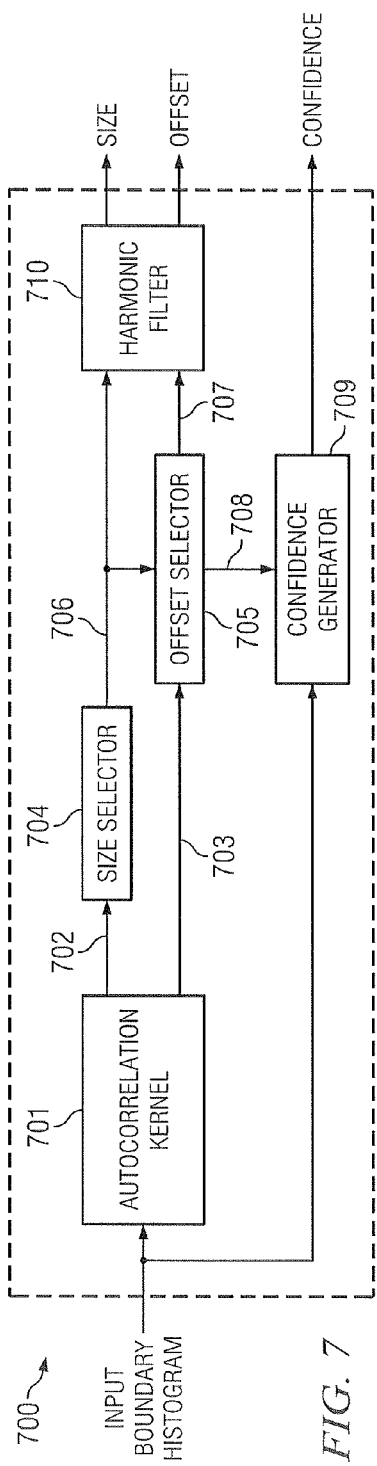
FIG. 7 illustrates a schematic diagram of an advantageous embodiment of an integer autocorrelation unit of the present invention.

FIG. 7 illustrates an advantageous embodiment of an autocorrelation system design of the present invention. The autocorrelation unit 700 that is illustrated in FIG. 7 may be used to implement the first integer autocorrelation unit 308 that is shown in FIG. 3 or the second integer autocorrelation unit 310 that is shown in FIG. 3.

The autocorrelation unit 700 comprises an autocorrelation kernel 701, a size selector unit 704, an offset selector unit 705, a confidence generator unit 709, and a harmonic filter 710, connected together as shown in FIG. 7. The autocorrelation kernel 701 applies autocorrelation to the input boundary histogram which is essentially a discrete series. The autocorrelation kernel 701 outputs to the size selector unit an array of autocorrelation values 702, each of which corresponds to a block size under detection. The autocorrelation kernel 701 also outputs to the offset selector unit 705 partial autocorrelation values 703 for each offset for each size under detection.

The size selector unit 704 selects the block size that corresponds to the maximum autocorrelation value in the array of autocorrelation values 702. The output size 706 is further processed in the harmonic filter 710 to filter out possible harmonics picked up in the autocorrelation process. The output size 706 is also provided to the offset selector unit 705. The offset selector unit 705 uses the output size 706 to select an array of partial autocorrelation values that correspond to the detected size from the set of input arrays 703 that are output from the autocorrelation kernel 701.

The offset selector unit 705 selects the offset 707 with the maximum partial autocorrelation value and outputs it to the harmonic filter 710. The offset selector unit 705 also provides the maximum partial autocorrelation value 708 to the confidence generator unit 709. The confidence generator unit 709 generates a value of detection confidence based on the maximum partial autocorrelation value 708 and other parameters. The harmonic filter 710 produces the final value of the size and offset. The confidence generator unit 709 produces the final value of the confidence measure for the detection.

The integer autocorrelation process for a discrete series is shown in Equation (1) and Equation (2). Equation (1) calculates "d" partial autocorrelation values $A_{part}$ for an integer size "d" under detection. To minimize computation, the value of "d" can be restricted to a range from eight (8) to twenty four (24), representing resealing factors from one (1) to three (3). In Equation (1) the value of "k" ranges of a value of zero ("0") to a value of "d" (including "0" but excluding "d") representing different possible offset positions for a size "d". Each (d,k) pair corresponds to a unique $A_{part}(d,k)$ for a particular input histogram "h".

In Equation (2) all the partial autocorrelation values corresponding to "k" different offset positions are summed together to obtain the autocorrelation result $A_{part}(d,k)$ for size "d".

$$A_{part}(d, k) = \sum_{i=0}^{size/d-1} h(i*d + k)h((i+1)*d) + k)(k \in [0, d)) \quad \text{Eq. (1)}$$

$$A_{total}(d) = \sum_{k=0}^{d-1} A_{part}(d, k) \qquad \text{Eq. (2)}$$

As shown in Equation (3), the block size $D_{max}$ corresponding to the largest autocorrelation value $A_{total}$ among all the "d" values is selected from the block size detector 704 as the integer block width candidate for a particular histogram "h".

$$A_{total}(D_{max}) = \max(A_{total}(d))(d \epsilon [8,24]) \qquad \text{Eq. (3)}$$

In autocorrelation, the harmonics might overtake the dominant frequency to yield the maximum autocorrelation value. For example, for original size sequences, sixteen (16) might produce a larger autocorrelation value than eight (8). The algorithm of the present invention addresses this issue by applying the harmonic filter 710 that is defined as in Equation (4).

if $(A_{total}(D_{max})*7/8 < A_{total}(D_{max}/2)$ $D_{max} = D_{max}/2$ if $(A_{total}(D_{max})*7/8 < A_{total}(D_{max}/3)$ $$D_{max} = D_{max}/3 \qquad \text{Eq. (4)}$$

As shown in Equation (5), for each histogram "h", the maximum partial autocorrelation value $A_{part}(D_{max}, K_{max})$ among all the $A_{part}(D_{max}, k)$ values are selected as input to the confidence generator unit 709 while the corresponding $K_{max}$ is selected as the offset output 707 of the offset selector unit 705.

$$A_{part}(D_{max}, K_{max}) = \max(A_{part}(D_{max}, k)(k \epsilon [0, D_{max}]) \qquad \text{Eq. (5)}$$

Figure 8:
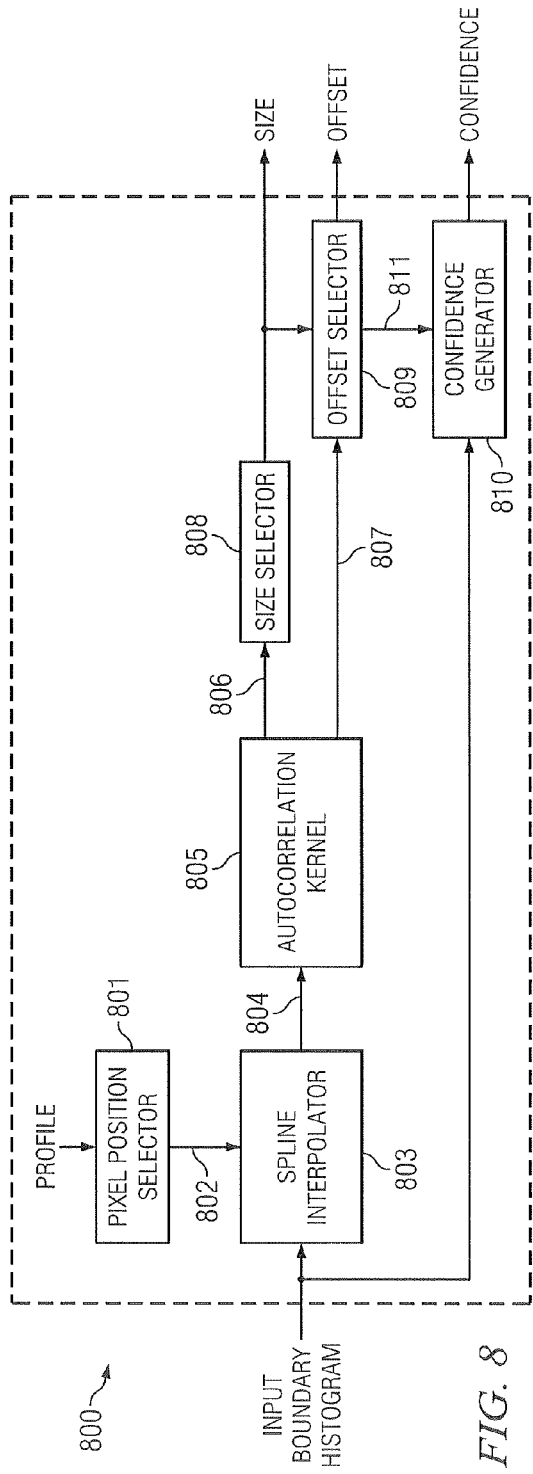
FIG. 8 illustrates a schematic diagram of an advantageous embodiment of a non-integer autocorrelation unit of the present invention.

FIG. 8 illustrates an advantageous embodiment of a non-integer autocorrelation system design of the present invention. The autocorrelation unit 800 that is illustrated in FIG. 8 may be used to implement the first non-integer autocorrelation unit 309 that is shown in FIG. 3 or the second non-integer autocorrelation unit 311 that is shown in FIG. 3.

The autocorrelation unit 800 comprises a pixel position selector 801, a spline interpolator unit 803, an autocorrelation kernel 805, a size selector unit 808, an offset selector unit 809, and a confidence generator unit 810, connected together as shown in FIG. 8.

The main difference between the integer autocorrelation unit 700 and the non-integer autocorrelation unit 800 is that the non-integer autocorrelation kernel 805 receives interpolated values 804 obtained from the spline interpolator unit 803. The non-integer pixel positions are selected in the pixel position selector 801. The pixel position selector 801 selects pixel positions based on the input non-integer block size and offset. The autocorrelation kernel 805 for the non-integer size detection is similar to the autocorrelation kernel 701 for the integer size detection. Similarly, the size selector unit 808 and the offset selector unit 809 for the non-integer size detection are similar to the size selector unit 704 and the offset selector unit 705 for the integer size detection.

The autocorrelation kernel 805 applies Equation (5) where "f" is a non-integer number. Instead of covering all of the decimal values from eight (8) to twenty four (24) (which results in $(24-8)*100=1600$), the non-integer autocorrelation process for every histogram input (for a precision of 0.01), range of "f" is customized to a set of typical profiles (such as 14.24 for PAL to 720p, or 21.33 for PAL to 1080i, etc.).

In the same manner as integer autocorrelation, Equation (6) and Equation (7) are used to obtain the autocorrelation result $A_{total}(f)$ for "f".

$$A_{part}(k, f) = \sum_{i=0}^{size/f-1} h(i*f + k)h((i+1)*f) + k)(k \in [0, \text{int}(f))) \qquad \text{Eq. (6)}$$

$$A_{total}(f) = \sum_{k=0}^{\text{int}(f)-1} A_{part}(k, f) \qquad \text{Eq. (7)}$$

In Equation (6) the function int(x) is a function that obtains the integer part of the input decimal value through cropping. As the input histogram h(i) is a discrete series, all of the h(i*f+k) values above can not be obtained from the input histogram directly. Interpolation is used to derive values at those non-integer positions. Upon evaluation bi-cubic or spline interpolation methods are preferred over linear interpolations. The spline interpolator unit 803 is used for this reason.

As shown in Equation (8), the interpolation method takes in four neighborhood histogram values to generate the value at a decimal position. The neighborhood pixel positions are obtained using Equation (7), corresponding to the calculation of the pixel position selector 801.

$$h(i*f) = \text{Interpolate} \begin{pmatrix} h(\text{int}(i*f - 1)), \\ h(\text{int}(i*f)), \\ h(\text{int}(i*f + 1)), \\ h(\text{int}(i*f + 2)) \end{pmatrix} \qquad \text{Eq. (8)}$$

The formula for the interpolation process is shown in Equation (9).

$$h(i*f) = \sum_{i=0,1,2,3} h(\text{int}(i*f - 1 + i) * f_i(s, Kshp)) \qquad \text{Eq. (9)}$$

$$s = i*f - (\text{int})i*f \qquad \text{Eq. (10)}$$

$$f_0(s, Kshp) = Kshp*(-s^3 + 2*s^2 - s)/2 \qquad \text{Eq. (11)}$$

$$f_1(s, Kshp) = (3*Kshp*s^3 - 5*Kshp*s^2 + 2*(Kshp-1)*s + 2)/2 \qquad \text{Eq. (12)}$$

$$f_2(s, Kshp) = (-3*Kshp*s^3 + 4*Kshp*s^2 + (2-Kshp)*s)/2 \qquad \text{Eq. (13)}$$

$$f_3(s, Kshp) = Shp*(s^3 - s^2)/2 \qquad \text{Eq. (14)}$$

In Equation (9), the term Kshp is an adjustable parameter which determines the shape of the spline. As shown in Equation (10), the term "s" is the decimal part of the non-integer position. Equations (11), (12), (13) and (14) show the formula for "$f_i$" for i=0, 1, 2, 3, respectively. In general, the higher confidence is obtained for the non-integer detection. Therefore the term Kshp can be used to tune the weight between the integer candidates and the non-integer candidates.

The selection of the non-integer size and non-integer offset using the output of the non-integer autocorrelation kernel 805 uses the same technique as the selection of the integer size and integer offset using the output of the integer autocorrelation kernel 701. Therefore, a detailed description of the selection technique used by the non-integer autocorrelation kernel 805 will not be given here because it is the same technique as that used by the integer autocorrelation kernel 701.

The selection of the final block width output from the integer candidates and the non-integer candidates is based on a common confidence generator unit 709 for integer correlation and on a common confidence generator unit 810 for non-integer correlation. In addition to the maximum partial autocorrelation value, the energy of the local maximums for the input histogram may be obtained from Equation (15).

$$P_h = \sum h(x)^2 (x \mid h(x-1) < h(x) \, \& \, h(x+1) < h(x)) \quad \text{Eq. (15)}$$

$P_h$ is the energy of a local maximum for the input histogram "h", while "x" is the element "id". The confidence value for a detection is obtained as the ratio of the two values.

$$\text{Conf}_h(D_{max}) = \frac{A_{part}(K_{max}, D_{max})}{P_h} \quad \text{Eq. (16)}$$

For every autocorrelation applied on every input histogram, $D_{max}$ and $K_{max}$ are obtained. $D_{max}$ is the detected size and $K_{max}$ is the detected offset. The maximum partial autocorrelation value $A_{part}(K_{max}, D_{max})$ corresponds to the signal 708 that is sent to the confidence generator unit 709 in the integer autocorrelation and corresponds to the signal 811 that is sent to the confidence generator unit 810 in the non-integer correlation. The value of the maximum partial autocorrelation $A_{part}(K_{max}, D_{max})$ is obtained through Equation (5). The local maximum energy $P_h$ is the same for both integer and non-integer confidence generation for one input histogram. The confidence level is designed based on the rationale that if all the boundary pixels are correctly detected and all noise correctly filtered, the boundary pixels will form all the local peaks in the histogram, generating very similar results for $A_{part}(K_{max}, D_{max})$ and $P_h$ and leading to a confidence value closer to one.

Figure 9:
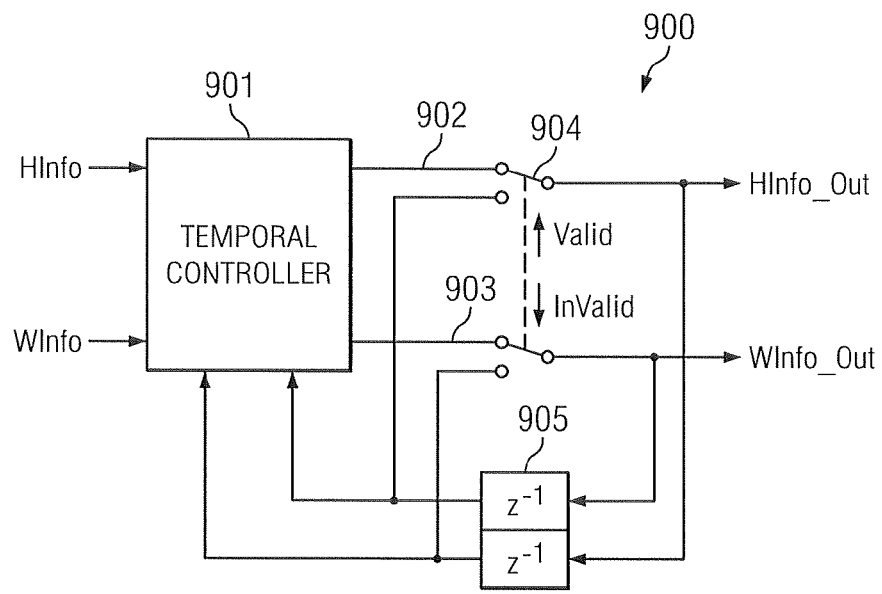
FIG. 9 illustrates a schematic diagram of an advantageous embodiment of a post processing unit of the present invention.

FIG. 9 illustrates an advantageous embodiment of a post processing unit 900 of the present invention. The post processing unit 900 that is illustrated in FIG. 9 may be used to implement the post processing unit 209 that is shown in FIG. 2. Post processing unit 900 comprises a temporal controller 901, a switch 904, and feedback delay units 905, connected together as shown in FIG. 9.

The main purpose of the post processor 209 (as implemented by post processor 900) is to improve the temporal stability of the result through the temporal controller 901. The temporal controller 901 processes the input height information (Hinfo) and the input width information (Winfo). The temporal controller 901 outputs a signal 902 that comprises the temporally processed height information including the height, the height offset and the height confidence (Hinfo_Out). The temporal controller also outputs a signal 903 that comprises the temporally processed width information including the width, the width offset and the width confidence (Winfo_Out).

The post processor 900 also receives a delayed version of the output results from the feedback delay units 905. The post processor 900 uses the delayed version of the output results for recursive control of the system output.

In addition to the temporal controller 901, the post processor 900 also applies a set of rules to validate the detected result on the current frame. As shown in FIG. 9, a switch 904 selects whether the results from the current frame shall be discarded or used according to the result of the validation. If the current result is valid, then the temporally processed result will be used. If the current result is not valid, then the result from previous frames will be used.

The validity of the current result is checked using the following criteria.

Cur_Height<=Cur_Width<Cur_Height*2

Cur_HConf*Cur_WConf>=400 where the expression Cur_Height represents the current height, and the expression Cur_Width represents the current width, and the expression Cur_HConf represents the current height confidence, and the expression Cur_WConf represents the current width confidence.

The first criterion utilizes the spatial relationship between the block height and the block width of a frame. Because the original block height and block width are equal (8×8), it is assumed that the height after resealing will not be larger than the width, because vertical zoom will usually not be larger than horizontal zoom for typical resealing scenarios such as SD (Standard Definition) to HD (High Definition) conversion. It is also assumed that the horizontal zoom will not be twice or more than the vertical zoom, because that will make the input image heavily distorted.

The second criterion considers the confidence value of the current detection. If the confidence value is too low, then the current result is considered to be invalid.

Figure 10:
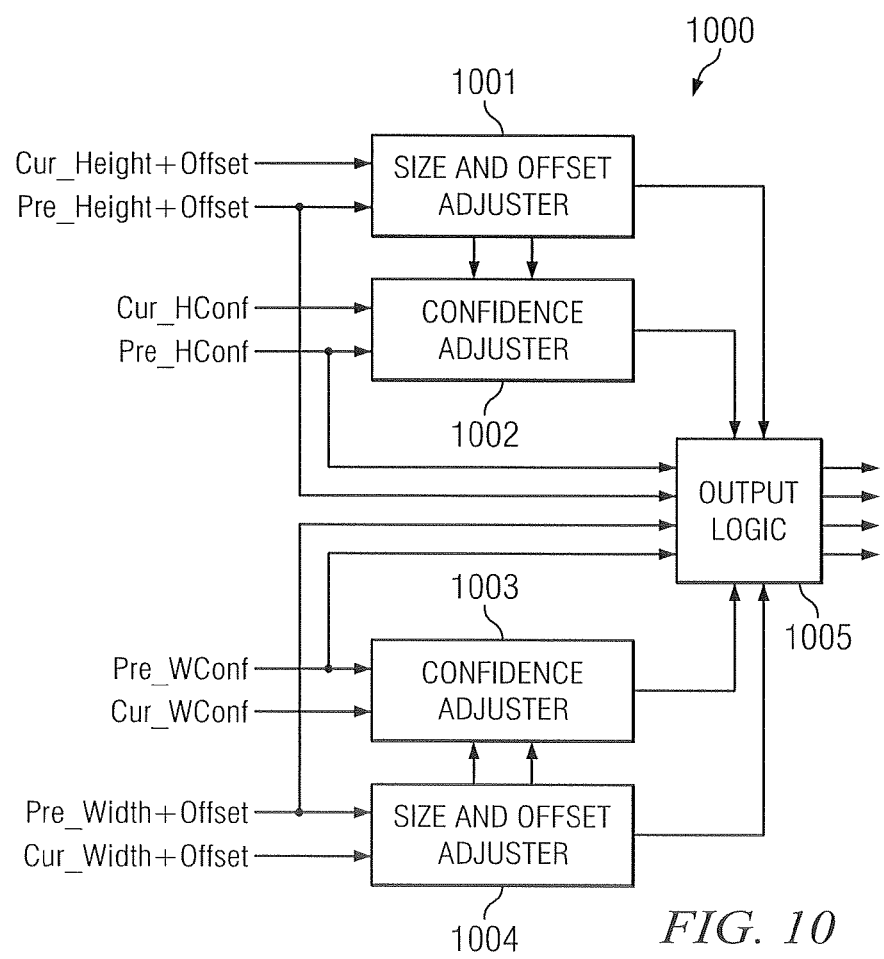
FIG. 10 illustrates a schematic diagram of an advantageous embodiment of a temporal controller unit of the present invention.

FIG. 10 illustrates an advantageous embodiment of a temporal controller 1000 of the present invention. The temporal controller 1000 that is illustrated in FIG. 10 may be used to implement the temporal controller 901 that is shown in FIG. 9.

The temporal controller 1000 comprises (1) a first size and offset adjuster unit 1001 and a first confidence adjuster unit 1002 for the height values, and (2) a second size and offset adjuster unit 1004 and a second confidence adjuster unit 1003 for the width values, and (3) an output logic unit 1005, connected as shown in FIG. 10. The first size and offset adjuster 1001 and the second size and offset adjuster 1004 equalize the current output with the previous output, in case they satisfy certain relationships.

As shown in FIG. 10, the first size and offset adjuster unit 1001 receives as input the current height and offset (designated as Cur_Height+Offset) and the previous height and offset (designated as Pre_Height+Offset). The first confidence adjuster unit 1002 receives as input the current height confidence (designated as Cur_HConf) and the previous height confidence (designated as Pre_HConf) and the output of the first size and offset adjuster unit 1001.

The second size and offset adjuster unit 1004 receives as input the current width and offset (designated as Cur_Width+Offset) and the previous width and offset (designated as Pre_Width+Offset). The second confidence adjuster unit 1003 receives as input the current width confidence (designated as Cur_WConf) and the previous width confidence (designated as Pre_WConf) and the output of the second size and offset adjuster unit 1004.

The output logic unit 1005 receives as input (1) the output of the first size and offset adjuster unit 1001, (2) the output of the first confidence adjuster unit 1002, (3) the previous height and offset (Pre_Height+Offset), (4) the previous height confidence (Pre_HConf), (5) the output of the second size and offset adjuster unit 1004, (6) the output of the second confidence adjuster unit 1003, (7) the previous width and offset (Pre_Width+Offset), and (8) the previous width confidence (Pre_WConf).

As shown in the pseudo code set forth below, the first two criteria check whether the current size is twice or half of the previous size. The check prevents the system from taking occasionally mis-detected harmonics as final output.

If (CurSize==2*PreSize)CurSize=PreSize;

If (CurSize*2==PreSize)CurSize=PreSize;

In the pseudo code above, the expression CurSize refers to the size detection result from the current frame. The expression PreSize refers to the size output from previous frames that have already been temporally processed.

Another two criteria check the relationship between the current result and the previous result. If the difference is less than a certain threshold, the adjuster will set the current offset to the previous offset. The threshold is a dynamic threshold determined by the block size. The larger the block size, the larger the tolerance on the difference between the current offset result and the previous offset result. The pseudo code for the two criteria is shown below.

If ($ABS$(CurOffset−PreOffset)<=PreSize/16)

Then CurOffset=PreOffset   Eq. (17)

ABS(x) is the absolute value of the quantity x. The expression CurOffset refers to the offset detection result from the current frame. The expression PreOffset refers to the offset output from previous frames that have already been temporally processed.

Another criterion checks whether the difference between the two offsets are equal to a DCT (Discrete Cosine Transform) block width. This criterion handles the possibility of detecting DCT block boundaries as macroblock boundaries, in which case the offset will shift by one DCT block. This is particularly true for the vertical direction due to the co-existence of frame/field coded macroblocks in one frame. While setting the current result equal to a previous result does not guarantee that the output provides the correct macroblock boundaries, it prevents the fluctuation of the offset position from frame to frame, which usually causes more negative impact on the temporal stability. The pseudo code for this criterion is shown below.

If ($ABS$(CurOffset−PreOffset−PreSize/2)<=PreSize/16)

Then CurOffset=PreOffset   Eq. (18)

The first confidence adjuster unit 1002 and the second confidence adjuster unit 1003 generate an adjusted confidence value that is based on the current confidence value and the previous confidence value. The following formulas are applied.

---
If(CurSize == PreSize && CurOffset == PreOffset)
    AdjConf = (PreConf * 12 + CurConf * 4) /16
Else
    AdjConf = (PreConf * 14 − CurConf * 2) /16
---

The expression CurConf refers to the offset detection result from the current frame. The expression PreConf refers to the offset output from previous frames that have already been temporally processed. The expression AdjConf refers to the confidence value after the above described adjustment has been made. The parameters that appear in the formulas above are exemplary parameters and can be adjusted according to the temporal stability requirement. If more stability is preferred over responsiveness, then the parameters that are associated with the PreConf (12, 14) can be adjusted to a lower value and the parameters that are associated with the CurConf (4, 2) can be adjusted to a higher value.

The output logic unit 1005 decides the size/offset/confidence output based on the sign of the adjusted confidence. In addition, the output logic unit 1005 also features an additional validity check that decides whether the adjusted result or the previous result shall be used. There are four scenarios that are associated with the signs of the two adjusted confidence values (one for height and one for width) The validity check is needed in Scenario III and in Scenario IV.

---
Scenario I: Adj_HConf >= 0 && Adj_WConf >= 0.
If (Adj_HConf >= 0 && Adj_WConf >= 0 {
Out_Height=PreHeight;      Out_Width = Pre_Width;
Out_HOffset=Pre_HOffset; Out_WOffset = Pre_WOffset;
Out_HConf=Adj_HConf;     Out_WConf = Adj_WConf; }
---

In the pseudo code for Scenario I the expression Adj_HConf refers to the adjusted height confidence and the expression Adj_WConf refers to the adjusted width confidence. If both adjusted confidences for height and width are larger than or equal to zero, then the previous size/offset (designated as Pre_Height/Pre_HOffset and Pre_Width/Pre_WOffset) will be selected as the final output size/offset and the adjusted confidence value will be used as the final output confidence value.

---
Scenario II: Adj_HConf < 0 && Adj_WConf < 0.
If (Adj_HConf < 0 && Adj_WConf <= 0 {
Out_Height=Cur_Height;     Out_Width = Cur_Width;
Out_HOffset=Cur_HOffset; Out_WOffset = Cur_WOffset;
Out_HConf=(−1)*Adj_HConf;   Out_WConf(−1)* Adj_WConf;}
---

In Scenario II where both the adjusted confidences for height and width are negative, the current size/offset will be selected as the final output size/offset, and the magnitude of the adjusted confidence value will be used as the final output confidence value.

---
Scenario III: Adj_HConf < 0 && Adj_WConf >= 0.
If (Adj_HConf < 0 && Adj_WConf >= 0 {
If (Valid) {
Out_Height = Cur_Height; Out_Width = Pre_Width;
Out_HOffset = Cur_HOffset; Out_WOffset = Pre_WOffset;
Out_HConf=(−1)*Adj_HConf; Out_WConf = Adj_WConf;  }
Else {
Out_Height = Pre_Height; Out_Width = Pre_Width;
Out_HOffset = Pre_HOffset; Out_WOffset = Pre_WOffset;
Out_HConf = Pre_HConf; Out_WConf = Adj_WConf; } }
Scenario IV: Adj_HConf >= 0 && Adj_WConf < 0.
If (Adj_HConf >= 0 && Adj_WConf < 0  {
If (Valid) {
Out_Width = Cur_Width; Out_Height = Pre_Height;
Out_WOffset = Cur_WOffset; Out_HOffset = Pre_HOffset;
Out_WConf=(−1)*Adj_WConf; Out_HConf = Adj_HConf; }
Else  {
Out_Width = Pre_Width; Out_Height = Pre_Height;
Out_WOffset = Pre_WOffset; Out_HOffset = Pre_HOffset;
Out_WConf = Pre_WConf; Out_HConf = Adj_HConf; }  }
---

In Scenario III and in Scenario IV where the two adjusted confidences have different signs, the situation is more complicated, because change of one result without changing the other result might cause an invalid height/width relationship.

Therefore an additional validity check is performed here. That is, if the change of height results in a valid height/width combination, then change of height is used and the adjusted confidence is used for both height and width. If the change of height results in an invalid height/width combination, then the previous height/offset/confidence result is retained and used and the adjusted confidence for width/offset is used.

The temporal controller 901 adjusts the output according to the validity and confidence level of the current detection and the confidence of the accumulated previous result. To ensure temporal stability, the new result, if different from the previous result, will only be used if the adjusted confidence value goes negative. Because the adjusted confidence is the weighted subtraction between the previous confidence value and the current confidence value, and the current confidence value is usually assigned a much lower weight, the output will use the previous result unless there are consecutive frames with different results.

The present invention solves the problems that are associated with block boundary detection for both non-rescaled sequences and rescaled sequences. The present invention gives the block boundary positions to relevant noise reduction algorithms. The present invention also provides a size output that serves as an indicator of the resealing factor. This can help relevant algorithms to decide an appropriate value for the adaptive filtering strength.

The non-integer block size detector of the present invention enables the detection of any linear resealing factors. This is particularly useful for typical resizing scenarios such as (1) PAL/NTSC to 720p, and (2) PAL/NTSC to 1080i, and (3) PAL/NTSC to 1080p, all of which have non-integer resealing factors. The present invention also provides a confidence generator that helps subsequent algorithms to decide the filtering strength. This makes sure that less noisy images with less visible boundaries are protected. The temporal controller 901 assists in providing a stable output, and gives a low confidence in case the output is not stable. This ensures an overall temporal stability of the digital noise reduction process.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The terms "controller" and "control circuit" mean any device, system, or part thereof that controls at least one operation. A controller or control circuit may be implemented in hardware, firmware, or software, or a combination of at least two of the same. It should be noted that the functionality associated with any particular controller or control circuit may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for detecting a block boundary within a video frame, the apparatus comprising:
   a boundary pixel identifier configured to obtain a first binary map of pixels that are classified under original boundaries and a second binary map of pixels that are classified under resealed boundaries;
   a first boundary histogram generator configured to convert the first binary map of pixels to a first boundary histogram;
   a second boundary histogram generator configured to convert the second binary map of pixels to a second boundary histogram; and
   a block boundary detector configured to use interpolated autocorrelation, the block boundary detector including:
      a block dimension detector for height configured to apply interpolated autocorrelation to the first and second boundary histograms to determine a value of block height, a value of block height offset and a value of block height confidence, and
      a block dimension detector for width configured to apply interpolated autocorrelation to the first and second boundary histograms to determine a value of block width, a value of block width offset and a value of block width confidence.

2. The apparatus as set forth in claim 1, further comprising:
   a deblocking filter configured to remove blocking artifacts along block boundaries; and
   a frame/field detector configured to detect whether each macroblock is frame coded or field coded.

3. The apparatus as set forth in claim 1, further comprising:
   a post processor having a plurality of inputs configured to receive outputs of the block dimension detector for height and outputs of the block dimension detector for width; and
   a temporal controller configured to improve temporal stability of the outputs of the block dimension detector for height and temporal stability of the outputs of the block dimension detector for width.

4. An apparatus for detecting a block boundary within a video frame, the apparatus comprising:
   a block boundary detector configured to use interpolated autocorrelation, the block boundary detector including:
      a block dimension detector for height configured to receive an input video frame and to process the input video frame to determine a value of block height, a value of block height offset and a value of block height confidence using interpolated autocorrelation, and
      a block dimension detector for width configured to receive the input video frame and to process the input video frame to determine a value of block width, a value of block width offset and a value of block width confidence using interpolated autocorrelation,
   wherein one of the block dimension detector for height and the block dimension detector for width comprises:
      a boundary pixel identifier;
      a first boundary histogram generator coupled to a first output of the boundary pixel identifier;
      a second boundary histogram generator coupled to a second output of the boundary pixel identifier;
      a first integer autocorrelation unit and a first non-integer autocorrelation unit coupled to an output of the first boundary histogram generator;

a second integer autocorrelation unit and a second non-integer autocorrelation unit coupled to an output of the second boundary generator unit; and a max confidence selector having inputs that are connected to outputs of the first integer autocorrelation unit, outputs of the first non-integer autocorrelation unit, outputs of the second integer autocorrelation unit, and outputs of the second non-integer autocorrelation unit.

5. The apparatus as set forth in claim 4, wherein the boundary pixel identifier is configured to identify possible block boundaries in an input video frame and to provide a binary map of pixels that are classified under original boundaries to the first boundary histogram generator and a binary map of pixels that are classified under rescaled boundaries to the second boundary histogram generator.

6. The apparatus as set forth in claim 5, wherein the first boundary histogram generator is configured to convert the binary map of pixels that are classified under original boundaries to an original boundary histogram, and the second boundary histogram generator is configured to convert the binary map of pixels that are classified under rescaled boundaries to a rescaled boundary histogram.

7. The apparatus as set forth in claim 6, wherein the first boundary histogram generator is configured to provide the original boundary histogram to the first integer autocorrelation unit and to the first non-integer autocorrelation unit, and the second boundary histogram generator is configured to provide the rescaled boundary histogram to the second integer autocorrelation unit and to the second non-integer autocorrelation unit.

8. The apparatus as set forth in claim 7, wherein the first integer autocorrelation unit is configured to apply interpolated autocorrelation to the original boundary histogram to determine an integer size candidate, an integer offset candidate and a confidence measure of the detection result of the first integer autocorrelation unit, the first non-integer autocorrelation unit is configured to apply interpolated autocorrelation to the original boundary histogram to determine a non-integer size candidate, a non-integer offset candidate and a confidence measure of the detection result of the first non-integer integer autocorrelation unit, the second integer autocorrelation unit is configured to apply interpolated autocorrelation to the resealed boundary histogram to determine an integer size candidate, an integer offset candidate and a confidence measure of the detection result of the second integer autocorrelation unit, and the second non-integer autocorrelation unit is configured to apply interpolated autocorrelation to the resealed boundary histogram to determine a non-integer size candidate, a non-integer offset candidate and a confidence measure of the detection result of the second non-integer integer autocorrelation unit.

9. The apparatus as set forth in claim 4, wherein the boundary pixel identifier comprises:
a vertical mask unit configured to receive an input video frame and to detect vertical boundaries in the input video frame;
an original vertical boundary test unit that is coupled to an output of the vertical mask unit, the original vertical boundary test unit configured to detect original vertical boundaries; and
a rescaled vertical boundary test unit that is coupled to an output of the vertical mask unit, the rescaled vertical boundary test unit configured to detect rescaled vertical boundaries.

10. The apparatus as set forth in claim 9, wherein the boundary pixel identifier further comprises:
a horizontal mask unit configured to receive an input video frame and to detect horizontal boundaries in the input video frame;
an original horizontal boundary test unit that is coupled to an output of the horizontal mask unit, the original horizontal boundary test unit configured to detect original horizontal boundaries; and
a rescaled horizontal boundary test unit that is coupled to an output of the horizontal mask unit, the rescaled horizontal boundary test unit configured to detect rescaled horizontal boundaries.

11. The apparatus as set forth in claim 10, wherein the boundary pixel identifier further comprises:
a vertical boundary enhancer unit configured to process vertical boundary pixel maps that are generated by the original vertical boundary test unit and the rescaled vertical boundary test unit; and
a horizontal boundary enhancer unit configured to process horizontal boundary pixel maps that are generated by the original horizontal boundary test unit and the rescaled horizontal boundary test unit.

12. The apparatus as set forth in claim 4, wherein one of the first boundary histogram generator and the second boundary histogram generator comprises:
a histogram generation unit configured to receive a boundary map as input and, for vertical maps, to count a number of weighted boundary pixels for each column and store the count into arrays of width equal to a width of the input video frame, and, for horizontal maps, to count a number of weighted boundary pixels for each row and store the count into arrays of height equal to a height of the input video frame.

13. The apparatus as set forth in claim 12, wherein one of the first boundary histogram generator and the second boundary histogram generator further comprises:
a histogram window unit coupled to an output of the histogram generation unit, the histogram window unit configured to store histograms from a current video frame and from n−1 previous video frames, where n is a configurable parameter;
a histogram average unit coupled to an output of the histogram window, the histogram average unit configured to average all histograms for the current video frame and n−1 previous video frames; and
a gradient filter mask coupled to an output of the histogram average unit.

14. The apparatus as set forth in claim 4, wherein one of the first integer autocorrelation unit and the second integer autocorrelation unit comprises:
an autocorrelation kernel configured to receive an input boundary histogram and to apply interpolated autocorrelation to the input boundary histogram;
a size selector unit configured to receive an array of autocorrelation values from the autocorrelation kernel, each of which corresponds to a block size under detection, and to select an output block size that corresponds to a maximum autocorrelation value in the array of autocorrelation values;
an offset selector unit configured to receive partial autocorrelation values for each offset for each size under detection from the autocorrelation kernel, to receive an output block size from the size selector unit, and to select an array of partial autocorrelation values that correspond to a detected size from a set of input arrays that are output from the autocorrelation kernel; and a confidence generator unit configured to receive a maximum partial autocorrelation value from the offset selector unit and to generate a final value of detection confidence based on the maximum partial autocorrelation value.

15. The apparatus as set forth in claim 4, wherein one of the first non-integer autocorrelation unit and the second non-integer autocorrelation unit comprises:

a pixel position selector configured to select pixel positions based on an input non-integer block size and offset;

a spline interpolator unit configured to receive an input boundary histogram, to receive non-integer pixel positions from the pixel position selector, and to generate interpolated values for the input boundary histogram;

an autocorrelation kernel configured to receive an interpolated boundary histogram from the spline interpolator unit and applies interpolated autocorrelation to the interpolated boundary histogram;

a size selector unit configured to receive an array of autocorrelation values from the autocorrelation kernel, each of which corresponds to a block size under detection, and to select an output block size that corresponds to a maximum autocorrelation value in the array of autocorrelation values;

an offset selector unit configured to receive partial autocorrelation values for each offset for each size under detection from the autocorrelation kernel, to receive an output block size from the size selector unit, and to select an array of partial autocorrelation values that correspond to a detected size from a set of input arrays that are output from the autocorrelation kernel; and a confidence generator unit configured to receive a maximum partial autocorrelation value from the offset selector unit and to generate a final value of detection confidence based on the maximum partial autocorrelation value.

16. A method for detecting a block boundary within a video frame using interpolated autocorrelation, the method comprising:

processing the video frame to obtain a first binary map of possible block boundary pixels under original boundaries and a second binary map of possible block boundary pixels under resealed boundaries;

converting the first binary map to a first boundary histogram and the second binary map to a second boundary histogram;

applying interpolated autocorrelation to the first and second boundary histograms to determine a value of block height, a value of block height offset, and a value of block height confidence; and applying interpolated autocorrelation to the first and second boundary histograms to determine a value of block width, a value of block width offset, and a value of block width confidence.

17. A method for detecting a block boundary within a video frame using interpolated autocorrelation, the method comprising:

processing the video frame to obtain a binary map of possible block boundary pixels by:

processing the video frame to obtain a first binary map of pixels that are classified under original boundaries;

providing the first binary map of pixels to a first boundary histogram generator;

processing the video frame to obtain a second binary map of pixels that are classified under resealed boundaries; and providing the second binary map of pixels to a second boundary histogram generator;

converting the at least one of the first and second binary maps to a boundary histogram; and applying interpolated autocorrelation to the boundary histogram to determine a value of block height, a value of block height offset, and a value of block height confidence; and applying interpolated autocorrelation to the boundary histogram to determine a value of block width, a value of block width offset, and a value of block width confidence.

18. The method as set forth in claim 17, further comprising:
converting the first binary map of pixels to a first boundary histogram in the first boundary histogram generator;

providing the first boundary histogram to a first integer autocorrelation unit and to a first non-integer autocorrelation unit;

applying interpolated autocorrelation to the first boundary histogram to determine the value of block height, the value of block height offset, and the value of block height confidence;

converting the second binary map of pixels to a second boundary histogram in the second boundary histogram generator;

providing the second boundary histogram to a second integer autocorrelation unit and to a second non-integer autocorrelation unit; and applying interpolated autocorrelation to the second boundary histogram to determine the value of block width, the value of block width offset, and the value of block width confidence.

19. The method as set forth in claim 18, further comprising:
providing outputs of the first integer autocorrelation unit, the first non-integer autocorrelation unit, the second integer autocorrelation unit, and the second non-integer autocorrelation unit to a max confidence selector;

temporally processing the outputs in a temporal controller within the max confidence selector;

outputting from the temporal controller a first signal that comprises temporally processed height information including a height, a height offset and a height confidence; and outputting from the temporal controller a second signal that comprises temporally processed width information including a width, a width offset and a width confidence.

20. The method as set forth in claim 19, further comprising:
determining whether results from a current video frame are valid;

using the first and second signals from the temporal controller for the current video frame if the results from the current video frame are valid; and using the first and second signals from the temporal controller for previous video frames if the results from the current video frame are invalid.

* * * * *

UNITED STATES PATENT AND TRADEMARK OFFICE
CERTIFICATE OF CORRECTION

PATENT NO.        : 8,681,875 B2
APPLICATION NO.   : 12/313830
DATED             : March 25, 2014
INVENTOR(S)       : Zhen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1283 days.

Signed and Sealed this
Second Day of June, 2015

Michelle K. Lee
*Director of the United States Patent and Trademark Office*